Jan. 10, 1950     C. G. KIRKBRIDE ET AL     2,494,392
PROCESS AND APPARATUS FOR TREATING EMULSIONS
Filed Jan. 7, 1946                2 Sheets-Sheet 2
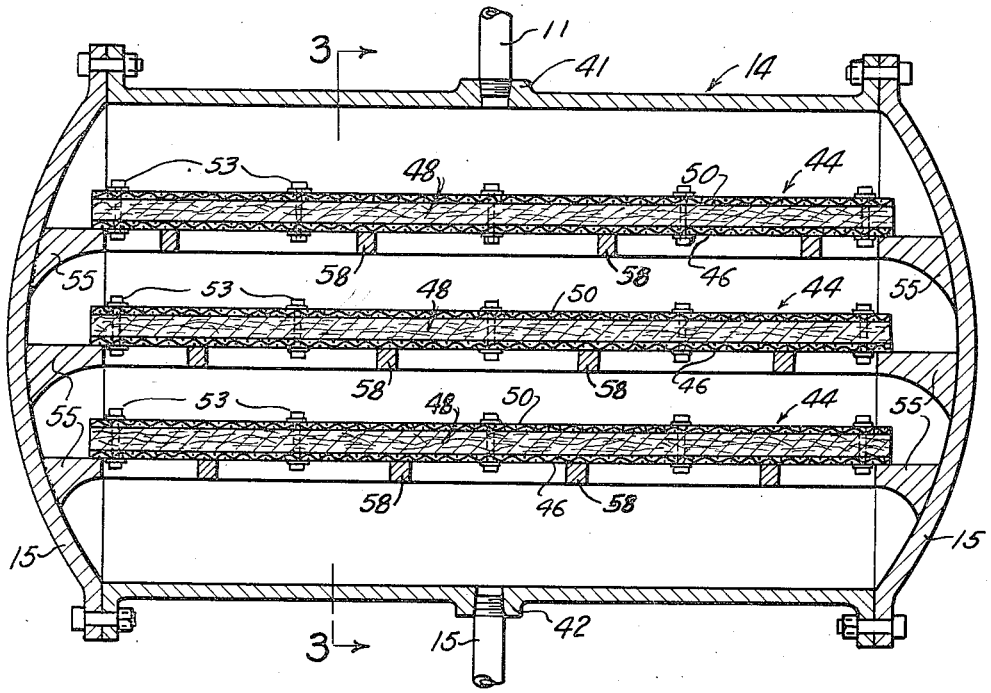
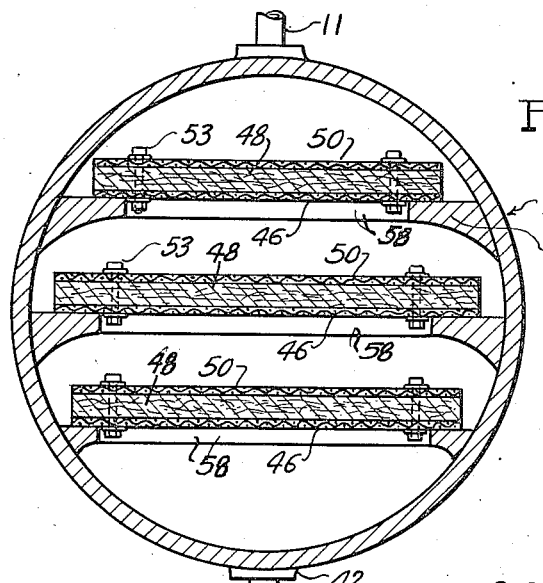
INVENTORS
C. G. Kirkbride &
T. A. Burtis
BY
ATTORNEYS Patented Jan. 10, 1950

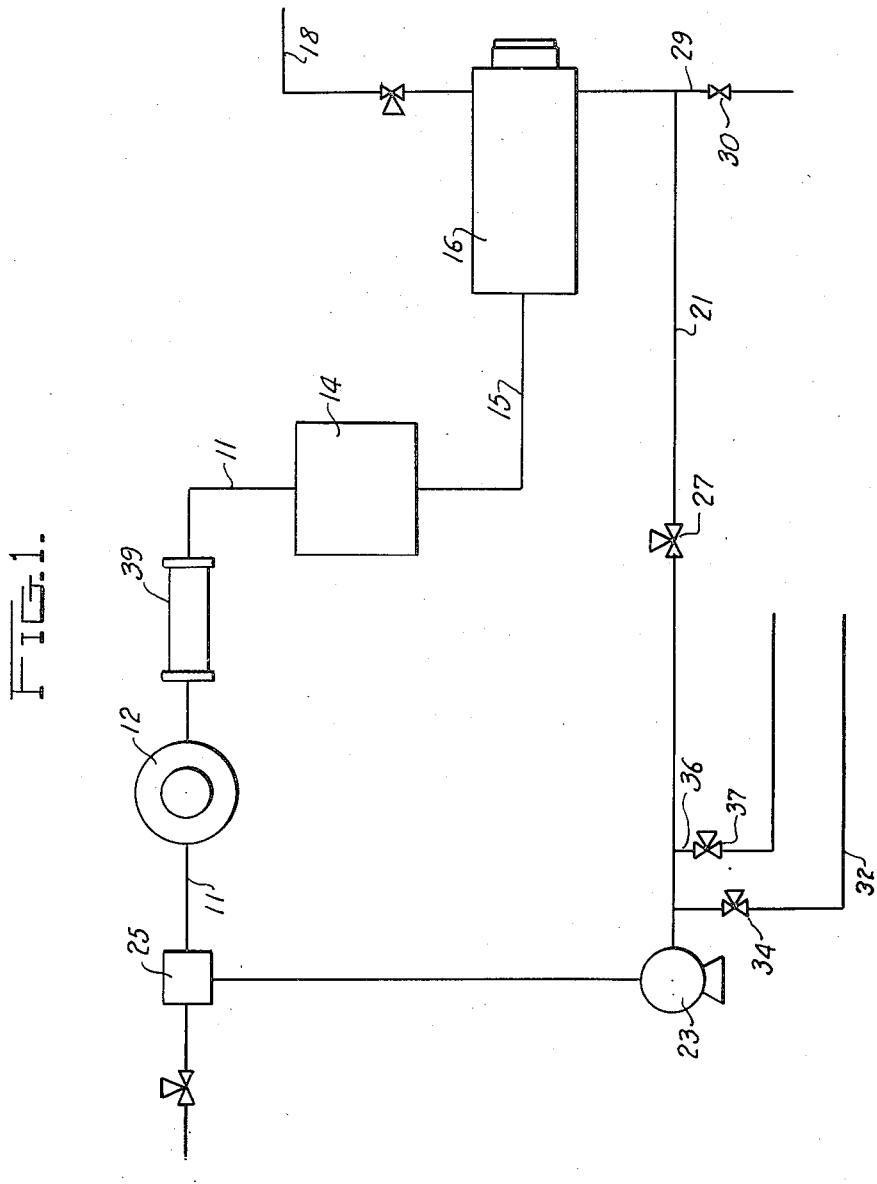

2,494,392

UNITED STATES PATENT OFFICE 2,494,392

PROCESS AND APPARATUS FOR TREATING EMULSIONS

Chalmer G. Kirkbride and Theodore A. Burtis, College Station, Tex., assignors to Texas A. and M. Research Foundation, College Station, Tex., a corporation of Texas Application January 7, 1946, Serial No. 639,662

14 Claims. (Cl. 252—324)

1

This invention relates to the demulsification of oils and more particularly to resolving petroleum emulsions of the water-in-oil type and especially those which contain fine droplets of naturally occurring brines dispersed throughout the oil as a discontinuous phase.

These petroleum emulsions contain varying percentages of salt water, the crude petroleum known as "Panhandle" crude containing, for instance, for each thousand barrels of crude oil as high as 400 pounds of salt in solution in the aqueous phase of the emulsion. This salt content must be greatly reduced before the crude oil is refined.

It has been suggested that petroleum and other oil emulsions might be resolved by passing the emulsion through a mass of fibrous glass to cause the dispersed droplets to coalesce and settle out of the emulsion. The efficacy of such a process is dependent in large part on the use of fine glass fibers, that is, fibers of diameters less than about .0004 of an inch, to provide an enormous surface area relative to the volume of the glass of the fibers. This large area of surface preferentially wetted by water provides an effective means for coalescing or agglomerating the dispersed water droplets.

In the treatment of petroleum emulsions containing naturally occurring brines as the dispersed phase, it has been found that the bed or mass of glass fibers deteriorates so rapidly that commercial operation is not feasible. This deterioration is apparently due in certain cases to the attack on the fibers by the dispersed phase, and is aggravated by the great surface area of the fibers relative to volume of glass presented to the dispersed phase. Resort to coarser fibers to lessen the attack would of course be inconsistent with obtaining the efficiencies required in the process. The use of surface protective agents on the glass fibers is likewise not feasible because it is the hygroscopic nature of the bare fiber surfaces that renders the process effective.

A second cause of deterioration may be attributable to the high pressure to which the mass of fibrous glass is subjected by the emulsion being passed through the mass. The high pressure differential is necessary to force the fluid through the small interstices of the thick mass of fibrous glass at rates providing an economical process and resultantly is so high that the fibers are crushed in a short time and rendered useless for the process. Resort to larger size fibers to avoid the need for such high pressures and to better resist pressure is precluded by the necessity of

2 having the large aggregate surface area of the fibrous material.

It is an object of the present invention to provide an efficient, commercially practicable process employing glass fibers for resolving brine-in-oil emulsions, and, more particularly, to provide such a process in which very fine glass fibers are employed but in which deterioration of the fibers is prevented.

These and other objects will be apparent from the following description in connection with the drawings, in which:

Figure 1 is a schematic illustration of one type of equipment that may be used in the present invention;

Figure 2 is a central longitudinal sectional view of the contactor receptacle containing fibrous glass; and Figure 3 is a cross-sectional view of the same taken in the plane of the line 3—3 of Figure 2.

Referring to Figure 1, the crude oil emulsion to be resolved is first heated in any ordinary manner, as by being passed through a heater 12 of conventional kind connected in the pipe line 11, to raise the temperature of the crude oil to about 200° to 400° F. and preferably about 250° to 300° F. At such temperatures resolution of the emulsion has been found to proceed with increased efficiency. The heated petroleum emulsion is then passed by means of the pipe 11 through a mass of fine glass fibers held in a contactor receptacle 14. The dispersed phase of the emulsion is agglomerated or coalesced by the glass fibers in the receptacle so that the emulsion is broken. The resolved emulsion is then passed through a pipe 15 into an ordinary settling chamber 16 such as that conventionally used in emulsion resolving processes and while in the chamber the agglomerated brine droplets settle out of the crude petroleum by gravity and collect at the bottom of the chamber. The oil is removed from the settling chamber through a line 18.

The brine that collects in the settling chamber is drawn from the chamber through a line 21 connected to a pump 23 and is fed by the pump to a mixer 25 connected in the line 11 in advance of the heater 12. The mixer 25 intimately mixes the brine with the crude oil to be treated and the intimacy of the mixture is enhanced when the crude oil and added brine passes through the heater 12. The quantity of brine intermixed with the crude oil is controlled by a manually or automatically operated valve 27, excess brine being drawn off by a pipe 29 having a manually or automatically operated valve 30 therein.

The amount of water in the form of recycled brine added to the crude oil at the mixer 25 is sufficient to have a substantial diluting effect on the relatively small amount of brine in the original emulsion with noticeable gain in the ease with which the emulsion is resolved. Water added to the crude oil emulsion in amounts of about .1 to .5 volume per volume of crude oil emulsion and preferably from about .2 to .3 volume per volume of crude oil emulsion have been found sufficient to effect these results. While all of the water added at the mixer might be fresh water, an economical heat balance on the process is maintained if the water added is recycled water or brine.

The salt content of the recycled brine is controlled so that the concentration of salt in the recycled water is not more than 7% and preferably not more than 3% by weight or is more than 20% by weight. This range has been found important in that salt concentrations intermediate these proportions, that is, more than 7% by weight and less than 20% by weight, result in emulsions that are so difficult to break that the oil leaving the settling chamber has been found on occasion to contain more salt than the original crude oil. Apparently the crude oil emulsion being processed picked up some of the salt from the recycled brine in addition to the salt content of the brine in the original emulsion. Best results are ordinarily obtained if the salt content of the recycled brine is less than 7% by weight.

The salt content of the recycled brine is controlled by adding fresh water to the recycled brine at a suitable point as through the pipe 32 connected with the pipe 21 leading to the pump, the pipe 32 having therein a manually controlled valve 34.

It has been found highly desirable to decrease the alkalinity of the crude emulsion before it enters the contactor. This is best accomplished by adding acid to the recycled brine as by a pipe 36 connected with the pipe 21 preferably in advance of the pump 23. A valve 37 may be provided in the pipe 36 for controlling the amount of acid fed into the brine. The acid added to the brine is preferably a corrosion inhibited sulfuric acid of conventional kind. Other acid such as hydrochloric may be used instead. The amount of acid added to the brine is preferably sufficient to maintain the pH of the brine being added to the crude oil less than about 9.0 and preferably between 7.0 to 8.0. When the recycled brine is maintained within this range or at least less than 9.0 and is added to the crude oil in the amount specified, no perceptible deterioration results from exposure of the fibrous glass to the oil and brine emulsion. In cases where the fresh water added to the recycled brine is also alkaline, additional acid will have to be added to likewise neutralize this excess alkalinity.

When desired, as when emulsions having therein a large proportion of silt are processed, an ordinary plate filter 39 may be provided in the line 11 in advance of the contactor 14.

As shown in Figures 2 and 3 the contactor receptacle 14 may be in the form of a cylindrical tank having detachable heads 15 bolted thereto. The free side of the receptacle has a threaded opening 41 to receive the end of the pipe 11 and the opposite side of the tank is provided with a threaded opening 42 into which the pipe 15 is fitted.

Supported within the receptacle are a plurality of beds 44 each comprising a lower foraminous plate 46 which may be of perforated metal, heavy wire screen or the like. There are preferably three beds although more may be provided if desired. Overlying the lower plate 46 is a mass 48 of fibrous glass held in compacted relation by an upper foraminous plate 50 which may also be of perforated metal or heavy wire screen. The plates 46 and 50 are clamped together as by means of bolts 53 passing through aligned openings in the plates and holding the plates together in fixed spaced relation.

The beds 44 are located in spaced relation and extend entirely across the receptacle so that the emulsion entering at the opening 41 and leaving through the opening 42 must pass through all of the beds in series. Each of the beds is supported at its ends on shelves or brackets 55 extending inwardly from the heads 15 and along its sides by shelves or brackets 56 extending inwardly from the side walls of the receptacle. Supporting bars 58 are joined at their ends to the brackets 56 and extend across the receptacle to support the beds at spaced intervals along their length. The beds are thus independently supported in the receptacle.

The joints between the lower plate 46 of each bed and the supporting brackets 55 and 56 are preferably sealed by means of gaskets to prevent leakage of the emulsion past the beds.

When it is desired to replace the fibrous glass of the beds 44 one head 15 of the receptacle is removed and the beds are drawn out endwise from the receptacle. The plates 46 and 50 of the beds are then unbolted and the fibrous glass removed from the bed and replaced with new. Ordinarily the fibrous glass in the upper bed, that is, the one through which the emulsion is first passed, is rendered unserviceable during the operation and requires replacement before the lower beds. In such a case the lower beds are preferably each moved up one position and the bed in which the fibrous glass has been replaced is inserted in the lowest position. Of course all of the beds may be replaced at the same time if desired.

The fibrous glass is installed in each bed while the beds are out of the receptacle by placing a sufficient quantity of fibrous material at normal densities between the plates 46 and 50 so that when the plates are drawn together to compress the fibrous material to the desired thickness the material will be at the desired final density.

It has been found desirable to employ fibrous glass in which the individual fibers are from about .0001 to .0004 inch in diameter, and preferably about .00025 to .0003 inch in diameter. The fibrous material is best in the form of masses of loosely assembled haphazardly arranged, intermatted fibers of from 8 to 15 or 20 inches in length, or in the form of bats or blankets of such fibers. These fibers are packed in the beds of the receptacle at densities of from about 10 to 15 pounds per cubic foot, preferably about 13 pounds per cubic foot with the beds about 2 inches thick. Beds may be of less thickness if the decrease in thickness is compensated by additional beds so that the length of the aggregate path through the beds is about 5 to 7 or more inches in length.

By employing beds of approximately 2 inches in thickness and made up of fibers whose diameter is from about .00025 to .00030 it has been found possible to maintain the pressure drop across each bed less than about 50 pounds per square inch while obtaining a superficial flow of fluid through the receptacle of about .1 to 1.0 foot per minute based on the oil phase only of the crude oil. Pressure drops through each bed of less than 50 pounds per square inch have been found to have no perceptible crushing effect on the fibrous glass while if the amount of fibrous material represented by the plurality of beds were combined in a single bed, the resultant pressure drop through the bed would within a period of several hours crush the fibers to such an extent that they must be replaced because of ineffectiveness in resolving the emulsion. The interruption in the process required to replace the fibrous material would of course materially detract from the efficiency of operation.

The efficiency of the present process is such that the salt content of naturally occurring emulsions of brine and crude oil can in substantially all cases be reduced to a maximum of 5 pounds of salt for each thousand barrels of oil by employing an aggregate depth of the beds of fibrous glass of about 6 inches and passing the crude oil emulsion through the beds seriatim at a superficial velocity of about .1 to 1.0 foot per minute based on the oil phase only. With increase in aggregate thickness of the beds the superficial velocity may be increased it being usually preferable to observe a ratio of aggregate bed thickness to superficial velocity of not less than about .2, where the bed thickness is expressed in inches and the superficial velocity in feet per minute. This ratio may be much higher if the allowable salt content of the oil from the process is in excess of the above specified maximum. Also operation at higher ratios presents a more favorable condition for resolving the emulsion and accordingly the ratio should be as high as is possible while obtaining the removal of the required amount of brine.

The invention is also useful in resolving emulsions of water-in-oil of other kinds such as those encountered sometimes in edible oil processing and at intermediate stages in the processing and refining of petroleum.

Various modifications may be made within the spirit of the invention and the scope of the claims.

We claim:

1. The process of removing salt water from petroleum emulsions in which the salt water is contained as the dispersed phase, which comprises passing the emulsion at a temperature within the range of 200° to 400° F., through a series of individually supported beds of closely packed glass fibers arranged to provide for a pressure drop of less than 50 lbs. per square inch across each bed, whereby progressive coalescence of the dispersed phase takes place, and then separating the coalesced portion from the remainder.

2. In an apparatus for resolving water-in-oil emulsions comprising a receptacle having a plurality of beds of fibrous glass arranged in series to provide for a pressure drop of less than 50 pounds per square inch across each bed as the emulsion passes therethrough, and means for supporting said beds within said receptacle independently of each other.

3. Apparatus for resolving water-in-oil emulsions comprising a receptacle having an inlet at one end and an outlet at the other, a plurality of beds of fibrous glass arranged in series in the receptacle between the openings and to which the entirety of the emulsion passes under pressure to effect de-emulsification on contacting the glass fiber surfaces, means for holding the fibrous glass of each bed under compression, and means for supporting said beds within said receptacle independently of each other.

4. The process of reducing the aqueous component of oil emulsions in which the aqueous component is contained as the dispersed phase, which process comprises progressively coalescing the dispersed phase by passing the entire emulsion under pressure through a series of spaced apart masses of closely packed glass fibers arranged to provide for a pressure drop in the emulsion of less than 50 pounds per square inch across the bed, and then separating the coalesced portion from the remainder.

5. The process of removing aqueous matter from oil emulsions in which the aqueous matter is contained as the dispersed phase, which process comprises progressively coalescing the dispersed phase by passing the entire emulsion downwardly through a series of vertically spaced apart horizontal beds of closely packed glass fibers each bed being of a thickness to provide for a pressure drop of less than 50 pounds per square inch across the bed, and then separating the coalesced portion from the remainder by gravitational settling means.

6. The process of removing salt water from petroleum emulsions in which the salt water is contained as the dispersed phase in oil, the process comprising introducing an amount of aqueous material with the petroleum emulsion, heating the mixture of aqueous material and petroleum emulsion to an elevated temperature, passing the entire mixture under pressure successively through each of a series of spaced apart beds of closely packed glass fibers arranged to provide for a pressure drop of less than 50 lbs. per square inch across each bed whereby coalescence of the dispersed phase progressively takes place into an aqueous and oily phase, and separating the aqueous phase from the remainder.

7. The process as claimed in claim 6 in which the aqueous material introduced into the petroleum emulsion is adjusted to a pH of less than 9.

8. The process as claimed in claim 6 in which the aqueous material introduced into the petroleum emulsion is added in an amount to maintain the ratio of 0.1 to 0.5 part of volume of water to 1 of oil emulsion.

9. The process as claimed in claim 6 in which the aqueous material introduced into the petroleum emulsion comprises a brine having a salt concentration selected to be in the range below 7 per cent and over 20 per cent by weight.

10. The process as claimed in claim 9 in which the brine comprises a part of the separated aqueous phase and fresh water in an amount to adjust the salt concentrtion of the aqueous material to less than 3 per cent by weight.

11. The process as claimed in claim 6 in which the superficial velocity of the mixture passing through the beds is between 0.1 and 1.0 foot per minute.

12. The process of removing salt water from petroleum emulsions in which the salt water is contained as the dispersed phase, the process comprising the steps of: mixing an amount of aqueous material with the emulsion to bring the ratio within the range of 0.1 to 0.5 of water to 1.0 of oil, heating the mixture to a temperature within the range of 200° F. to 400° F., separating the solid particles from the mixture, passing the mixture under pressure through each of a series of spaced apart beds of closely packed glass fibers in which the fibers are arranged for a pressure drop of less than 50 lbs. per square inch across each bed whereby coalescence of the dispersed phase progressively takes place, and then gravitationally separating the aqueous portion from the remainder.

13. In the process of resolving a crude containing oils and aqueous salt solution in emulsion form, the steps of passing the emulsion at a temperature with the range of 200° to 400° F. through a series of separated layers of glass fibers arranged to provide for a pressure drop of less than 50 pounds per square inch across a layer whereby progressive coalescence takes place, and then separating the coalesced salt-containing portion from the remainder.

14. Apparatus for resolving water-in-oil emulsions comprising a receptacle having an inlet at one end and an outlet at the other, a plurality of beds of fibrous glass arranged to provide for a pressure drop across a bed of less than 50 pounds per square inch and arranged in spaced-apart relation across the receptacle between the inlet and outlet, and means for supporting the beds within the receptacle to permit their separate removal.

CHALMER G. KIRKBRIDE.
THEODORE A. BURTIS.

The following references are of record in the file of this patent:

UNITED STATES PATENTS

| Number | Name | Date |
|---|---|---|
| 40,369 | Sussner | Oct. 20, 1863 |
| 1,506,115 | Donaldson et al. | Aug. 16, 1924 |
| 1,739,898 | Gard et al. | Dec. 17, 1929 |
| 1,840,164 | Hirt | Jan. 5, 1932 |
| 1,847,413 | Pollock | Mar. 1, 1932 |
| 1,947,709 | Garrison et al. | Feb. 20, 1934 |
| 2,027,410 | Weir | Jan. 14, 1936 |
| 2,306,986 | Tolman | Dec. 29, 1942 |
| 2,329,887 | Eggleston et al. | Sept. 21, 1943 |
| 2,355,077 | Johnson | Aug. 8, 1944 |
| 2,454,605 | Kirkbride et al. | Nov. 23, 1948 |

OTHER REFERENCES

"Filtering by Means of Spun Glass," article in Scientific American, Dec. 11, 1920, vol. 123, page 593.